United States Patent
Calabrese et al.

(10) Patent No.: US 10,237,021 B2
(45) Date of Patent: Mar. 19, 2019

(54) NETWORK DEVICE AND METHOD THEREOF

(71) Applicant: HUAWEI TECHNOLOGIES CO., LTD., Shenzhen, Guangdong (CN)

(72) Inventors: FrancescoDavide Calabrese, Kista (SE); Yang Cao, Shanghai (CN); Peter Legg, Kista (SE); Chengqun Tan, Shanghai (CN); Yang Yu, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 15/345,632

(22) Filed: Nov. 8, 2016

(65) Prior Publication Data
US 2017/0054530 A1 Feb. 23, 2017

Related U.S. Application Data

(63) Continuation of application No. PCT/EP2014/059410, filed on May 8, 2014.

(51) Int. Cl.
*H04W 72/04* (2009.01)
*H04L 1/18* (2006.01)
(Continued)

(52) U.S. Cl.
CPC .......... *H04L 1/1812* (2013.01); *H04L 1/1845* (2013.01); *H04W 72/042* (2013.01);
(Continued)

(58) Field of Classification Search
CPC ................. H04L 1/1812; H04L 1/1845; H04L 2001/0093; H04W 72/0413;
(Continued)

(56) References Cited

U.S. PATENT DOCUMENTS

| | | | |
|---|---|---|---|
| 6,768,907 B1* | 7/2004 | Mohebbi | H04W 36/18 370/331 |
| 2004/0160925 A1* | 8/2004 | Heo | H04L 1/1845 370/335 |

(Continued)

FOREIGN PATENT DOCUMENTS

| | | |
|---|---|---|
| CA | 2655714 C | 5/2014 |
| CN | 101490979 A | 7/2009 |

(Continued)

OTHER PUBLICATIONS

International Search Report dated Jan. 20, 2015, in corresponding International Patent Application No. PCT/EP2014/059410.

(Continued)

*Primary Examiner* — Robert J Lopata
(74) *Attorney, Agent, or Firm* — Staas & Halsey LLP (57) ABSTRACT

The present invention relates to a network device (1) for joint decoding of received signals in a cellular wireless communication system (50) comprising a plurality of spatially distributed base stations (10) interconnected to said network device (1) by means of at least one backhaul interface having a round-trip delay being larger than a transmission interval for a HARQ cycle of a HARQ algorithm employed by the cellular wireless communication system (50), said network device (1) comprising a processor ( ) adapted to: receive a plurality of baseband signals (BBSs) corresponding to uplink signals received by said plurality of base stations (10) in uplink radio links, said uplink signals being associated with an uplink transmission (ULT) from a user device (20); and decode said uplink transmission (ULT) from said user device (20) by combining said plurality of baseband signals (BBSs).

17 Claims, 7 Drawing Sheets

(51) Int. Cl.
*H04L 1/00* (2006.01)
*H04W 84/04* (2009.01)

(52) U.S. Cl.
CPC . *H04W 72/0413* (2013.01); *H04L 2001/0093* (2013.01); *H04W 84/042* (2013.01)

(58) Field of Classification Search
CPC . H04W 72/042; H04W 84/042; H04W 72/04; H04W 72/12; H04W 76/00; H04B 7/2121; H04B 7/2123; H04J 2203/0069; H04Q 2213/394
USPC .......................................................... 370/329
See application file for complete search history.

(56) References Cited

U.S. PATENT DOCUMENTS

| | | | |
|---|---|---|---|
| 2005/0073975 A1 | 4/2005 | Chen et al. | |
| 2005/0096054 A1* | 5/2005 | Zhang ................ | H04L 1/1812 455/442 |
| 2006/0039325 A1* | 2/2006 | Sebire ................. | H04L 1/0045 370/329 |
| 2006/0215662 A1* | 9/2006 | Zhang ................ | H04L 1/1887 370/394 |
| 2006/0240826 A1* | 10/2006 | Shinozaki ............. | H04L 1/0009 455/436 |
| 2007/0281695 A1* | 12/2007 | Lohr ................. | H04W 72/1278 455/436 |
| 2008/0076432 A1* | 3/2008 | Senarath .............. | H04W 36/18 455/442 |
| 2008/0167047 A1* | 7/2008 | Abedi ................. | H04W 36/18 455/442 |
| 2008/0192685 A1* | 8/2008 | Usuda ................. | H04W 28/10 370/329 |
| 2008/0207216 A1* | 8/2008 | Usuda ................. | H04L 47/10 455/453 |
| 2009/0185521 A1 | 7/2009 | Li et al. | |
| 2009/0238148 A1* | 9/2009 | Englund ............. | H04W 52/228 370/335 |
| 2009/0316648 A1* | 12/2009 | Kim .................... | H04L 1/1854 370/331 |
| 2011/0038316 A1* | 2/2011 | Hatakeyama ........ | H04L 1/1809 370/328 |
| 2011/0128926 A1* | 6/2011 | Nama ............... | H04W 72/1252 370/329 |
| 2012/0213092 A1* | 8/2012 | Sun ..................... | H04W 52/244 370/248 |
| 2013/0242734 A1* | 9/2013 | Fang ................... | H04W 48/16 370/230 |
| 2014/0086057 A1* | 3/2014 | S Gfors ............... | H04L 47/12 370/235 |
| 2014/0098768 A1* | 4/2014 | Zhang ................ | H04L 1/1812 370/329 |
| 2014/0161203 A1* | 6/2014 | Nammi ................ | H04B 7/024 375/267 |
| 2014/0211690 A1* | 7/2014 | Nama ................. | H04W 8/26 370/328 |
| 2014/0293884 A1* | 10/2014 | Larsson ............... | H04L 1/0073 370/329 |
| 2014/0293887 A1* | 10/2014 | Kumar ............. | H04W 74/0833 370/329 |
| 2014/0334459 A1* | 11/2014 | Larsson ............... | H04B 7/0413 370/336 |
| 2016/0080117 A1* | 3/2016 | Christoffersson ..... | H04L 1/1887 370/329 |

FOREIGN PATENT DOCUMENTS

| | | |
|---|---|---|
| CN | 101534181 A | 9/2009 |
| CN | 102916732 A | 2/2013 |
| EP | 1564908 | 8/2005 |
| WO | 2011/157519 | 12/2011 |
| WO | 2012/089145 | 7/2012 |
| WO | 2014021774 A2 | 2/2014 |

OTHER PUBLICATIONS

Huawei: "HARQ Operation for uplink CoMP", 3PGG Draft; R2-094790 3$^{rd}$ Generation Partnership Project (3GPP), Mobile Competence Center; 650, Route Des Lucioles; F-06921 Sophia-Antipolis Cedex; France, no. Shenzen, China; Aug. 17, 2009, Aug. 17, 2009.
Dr. Stefan Parkvall, "3G Evolution—HSPA and LTE for Mobile Broadband Part II," Ericsson Research, 2009.
International Search Report dated Jan. 20, 2015 in corresponding International Application No. PCT/EP2014/059410.
Office Action, dated Nov. 27, 2018, in Chinese Application No. 201480078635.1 (5 pp.).

\* cited by examiner

NETWORK DEVICE AND METHOD THEREOF

CROSS-REFERENCE TO RELATED APPLICATIONS

This application is a continuation of International Application No. PCT/EP2014/059410, filed on May 8, 2014, the disclosure of which is hereby incorporated by reference in its entirety.

TECHNICAL FIELD

The present invention relates to a network device adapted for joint decoding of received signals in a cellular wireless communication system. Furthermore, the present invention also relates to a corresponding method, a computer program, and a computer program product.

BACKGROUND

In conventional High Speed Packet Access (HSPA) networks, mobile usage in e.g. stadiums and at special events are characterized by strong bandwidth requirement in the Uplink (UL) as users often undertake photo and video uploads to applications, such as Facebook and YouTube. Often the communication network experiences excessive received power in this type of scenarios known as power rises and the resulting user experience is therefore poor.

Inter-cell interference is the main cause of the above mentioned problem. Cloud Radio Access Network (RAN) architectures in which received signal processing from many cells of a network is processed centrally in a single network node can address this issue by combining the received signals at multiple cell sites arising from a single UL transmission from a user. However, it is not always practical or cost-effective to deploy a Cloud RAN since e.g. very fast backhaul (such as fibre backhaul) must be provided between each cell site and the central baseband processing unit.

The most important characteristics of the network structure and the data and control channels over the air interface for High Speed Uplink Packet Access (HSUPA) are:

A User Equipment (UE) transmits user plane data on the E-DPDCH channel when granted radio resources by its serving cell;

Grants control the transmission rate the UE can transmit (equivalently the transmit power or modulation and coding scheme):
  The serving cell issues "absolute grants" indicating a baseline rate,
  "Relative grants" issued by all cells in the active set (see below) can then adjust this up or down (or stay the same, "hold"),
  Grant decisions and scheduling decisions are made in the Node Bs.

For cell edge UEs these transmissions may be decoded at multiple cells (the set of cells is called the active set) this is known as soft handover and improves the throughput of the UE:
  Typically add links to active set when within a threshold (e.g. 3 dB) of the serving cell in DL strength (Received Signal Code Power, RSCP),
  Typically active set size is limited to two or four.

A Node B can support multiple cells that are part of the active set of a UE—these cells are called the Radio Link Set (RLS):
  Transmissions over a RLS can be soft combined at the Node B—this is called softer handover.

Each RLS uses a Hybrid Automatic Repeat Request (HARQ) protocol to manage retransmissions and combination of transmissions of the same packet by the UE: The UE will continue to retransmit a packet until one RLS indicates it has been received successfully (with a HARQ Acknowledgement (ACK)).

All successfully received packets are sent over the so called Iub interface to the Radio Network Controller (RNC) which performs reordering if they are out-of-sequence.

In typical HSUPA implementations the Downlink (DL) control signalling on active set legs consumes significant power especially the Downlink Physical Control Channel (DPCCH) channel. Further, the DL and UL path losses are often not balanced for a UE to a cell because HSUPA use Frequency Division Duplex (FDD), so the UL radio links with the lowest losses are not identified by the DL RSCP measurement performed by the UE, and are therefore not included in the active set. The limitation of the active set size means useful power on the UL is not demodulated meaning higher UE transmit power and greater inter-cell interference.

One conventional solution uses a technique in which DL active sets and UL active sets are no longer matched which means that more links are used in the UL than in the DL. Further, active set on the uplink is extended for Node Bs which have an existing UL radio link. This solution needs to have an existing DL radio link for that Node B. Also UL signal combining only occurs for links of a single Node B.

The limitations of this method are that the method is unable to add links on uplink unless recognized that there should be a downlink radio link from same Node B. Further, the method does not address DL/UL imbalance and also limits combining gain on the UL. Also this method does not reduce overhead of DL control channels.

Another conventional solution is called Cooperative Multipoint Transmission/Reception (COMP) and is a set of schemes introduced for LTE Advanced which exploit coordination of transmissions to/from multiple base stations (eNBs). On the uplink, COMP may combine the received signals from a UE at two different base stations together at one of the two base stations. This is similar to soft combining (softer handoff) in HSUPA but occurs using two base stations at different locations. Alternatively, interference may be cancelled at one base station using the received signal from the same UE transmission at another base station. Both methods require a high bandwidth and low delay backhaul interface between base stations to exchange received signals (e.g. received soft bits after demodulation). The bandwidth of the backhaul needs to be high to exchange the volume of bits (hard or soft) for each transmission (every TTI which is 1 ms for LTE), and delay must be low such that the HARQ ACK/NACK can be generated in a timely fashion (4 ms). This backhaul is typically fibre, which is very expensive to install. COMP can also exploit a third node in a more hierarchical configuration—this is often called CloudRAN.

For HSUPA, COMP could be realized with joint combining at the RNC or other central node if fibre backhaul was provided. For HSUPA the TTI is typically 2 ms and the time before a NACK/ACK should be sent is about 6 ms.

Thus, there is a need for improved solutions in the art.

SUMMARY

An objective of the present invention is to provide a solution which mitigates or solves the drawbacks and problems of conventional solutions for reception of uplink transmissions from a user device.

Another objective of the present invention is to provide a solution for reception of uplink transmissions from a user device at multiple base stations when the backhaul delay is too high to allow joint decoding and indication of ACK/NACK to all base stations receiving the transmission in time to send the ACK/NACK to the user device.

According to a first aspect of the invention, the above mentioned and other objectives are achieved with a network device for joint decoding of received signals in a cellular wireless communication system comprising a plurality of spatially distributed base stations interconnected to said network device by means of at least one backhaul interface having a round-trip delay being larger than a transmission interval for a Hybrid Automatic Repeat Request, HARQ, cycle of a HARQ algorithm employed by the cellular wireless communication system, said network device comprising a processor adapted to:
 receive a plurality of baseband signals corresponding to uplink signals received by said plurality of base stations in uplink radio links, said uplink signals being associated with an uplink transmission from a user device; and
 decode said uplink transmission from said user device by combining said plurality of baseband signals.

According to a second aspect of the invention, the above mentioned and other objectives are achieved with a method for joint decoding of received signals in a cellular wireless communication system comprising a plurality of spatially distributed base stations interconnected to a network device by means of at least one backhaul interface having a round-trip delay being larger than a transmission interval for a HARQ cycle of a HARQ algorithm employed by the cellular wireless communication system, the method comprising the steps of:
 receiving a plurality of baseband signals corresponding to uplink signals received by said plurality of base stations in uplink radio links, said uplink signals being associated with an uplink transmission from a user device; and
 decoding said uplink transmission from said user device by combining said plurality of baseband signals.

Embodiments of the invention enable decoding of uplink transmissions using more radio links than in current implementations, thereby giving gains in throughput for all user devices and particularly for those on the cell edges. The present solution benefits from macro diversity gain and HARQ gain.

Further, downlink control signalling overhead is reduced with embodiments of the invention. Moreover, the above advantages can be achieved in existing network architecture, such as HSUPA, and/or in network architecture without fibre backhaul.

The uplink is the transmission link from the user device to the base station(s) whilst the downlink is the transmission link from the base station(s) to the user device.

The present invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

According to an embodiment the cellular wireless communication system is adapted to provide more uplink radio links from said user device than downlink radio links to said user device during said uplink transmission.

According to one aspect, every one of said plurality of base stations with an uplink radio link has at least one downlink radio link. This has the advantage that more uplink transmissions can be used in the decoding, thus improving the decoding success probability, but at the same time every base station is able to send ACK/NACK to said user device. To achieve this at least one base station should support multiple uplink radio links (in softer handoff), and this number should exceed the number of downlink links from the base station. For example, one base station could support two uplink radio links but only one in the downlink.

According to another aspect one or more of said plurality of base stations receiving the uplink transmission has no downlink radio link to said user device. This has the advantage in that additional uplink radio links can be added with consequent gain in uplink decodability without incurring additional downlink radio resource cost. Alternatively, downlink radio links can be removed without impairing uplink performance.

According to another embodiment said processor is further adapted to establish the uplink radio links after sharing at least one transmission signature for said user device. The transmission signature may according to an embodiment be a spreading sequence. This has the advantage of allowing a base station to search and identify which user devices are generating significant receive power into its cells for which the cell in question is not in the active set of the user device. Thus strong interfering user devices can be identified and then an uplink radio link can be established for the user device allowing the transmission to help in decoding rather than just adding interference. This mechanism of base station identification of the uplink radio link set requires no additional user device measurements. Furthermore, when DL and UL are imbalanced the strongest UL links can still be identified, since conventional active set determination exploits user device measurements that are performed on DL pilot signals.

According to yet another embodiment said processor is further adapted to combine said plurality of baseband signals using soft combining or selection combining. Selection combining allows the network device to identify that at least one base station has decoded the UL transmission on its own and further HARQ (re-)transmissions are not needed. Soft combining on the other hand may be able to decode the transmission when each base station on its own is unable to do so. Consequently, the Signal to Interference and Noise Ratio (SINR) requirements or UE transmit power requirements are reduced giving higher system throughput.

According to yet another embodiment said network device is a central network controller, or an integrated part thereof, and further adapted to send an Acknowledgement, ACK, or a Negative Acknowledgement, NACK, to said plurality of base stations based on a result of the decoding of said plurality of baseband signals. Preferably, the central network controller may be a RNC according to another embodiment. When the network device is a central network controller (or part thereof) existing Iub interfaces can be used to transfer baseband signals, and this may have lower delay than a base station to base station connection. Additionally, received baseband signals from all base stations (with an uplink radio link to the user device) can be jointly decoded at the same time. For example, decoding can be attempted using HARQ transmissions 1 and 2 from all base stations that have uplink radio links to the user device. When decoding takes place at the base station, there can be an additional received transmission from the base station where the network device is located during the decoding. For example, decoding can be attempted using HARQ transmissions 1 and 2 received at the network device base station, together with HARQ transmission 1 from all other base stations that have uplink radio links to the user device (and passed over the backhaul to the network device).

According to this embodiment said network device may be a base station or an integrated part thereof. When the network device is a base station (or a part thereof) the existing circuitry for decoding of softer handoff transmissions can be re-used to perform soft combining of signals from multiple base stations. This simplifies the hardware adaptation needed to support the present solution. Furthermore, the baseband signals received at the network device itself are immediately available without needing to be forwarded to another network node.

According to this embodiment the network device may be a serving base station for said user device. This has the advantage that the serving base station typically has the strongest uplink radio link to the user device (it has the lowest downlink mean path loss and this normally equates to the lowest uplink mean path loss). Thus, when joint decoding is attempted after a baseband signal has been generated at the serving base station then this will use (at least) one more transmission to the serving base station than to other base station. For example, decoding can be attempted using transmissions 1 and 2 received at the serving base station together with HARQ transmission 1 from all other base stations that have uplink radio links to the user device (and passed over the backhaul to the network device).

According to the above embodiments said network device may be a base station having a lowest computational load among said plurality of base stations. This has the advantage of balancing the computation load among the network devices of the network.

According to the above embodiments said processor is further adapted to send an ACK or a NACK to said user device based on a result of the decoding of said plurality of baseband signals. Thus the ACK or NACK represents the outcome of the best decoding attempt possible given the combination of uplink transmissions, at the point in time when the ACK/NACK should be sent.

According to the above embodiments said processor is further adapted to combine baseband signals corresponding to uplink signals for previous n−1 HARQ transmissions and a baseband signal corresponding to an uplink signal for n-th HARQ transmission associated with said serving base station from said user device. This method is used to provide the earliest decoding result possible when joint decoding is undertaken at a base station and assuming the backhaul delay to deliver bits from a base station to the network device base station is less than the HARQ cycle time.

According to yet another embodiment said processor is further adapted to combine baseband signals corresponding to uplink signals for first n HARQ transmissions from each of the base stations. This is beneficial when the decoded result at the point in time when the n HARQ transmission is received is negative, but at a point later in time all baseband signals from all n HARQ transmissions to all base stations could give a positive result. This result could be obtained earlier than the time of HARQ transmission n+1, in other words, at a point in time between transmissions n and n+1. This method gives the maximum combining gain by using all transmissions to all of said base stations. It would e.g. be used when the network device is a central network node, for example an RNC.

According to yet another embodiment the HARQ algorithm is configured to send an ACK at n-th HARQ transmission of a HARQ process associated with said user device even if a decoded result from the n HARQ transmissions is unsuccessful. This has the advantage of truncating the user device transmissions when it is expected that the joint decoding result from all transmissions to all base stations (with uplink radio links) should be successful.

According to these embodiments n according to a further embodiment equals to 1, 2, or 3. With n=1 the user device only does one transmission which results in low delay although higher SINR is required to avoid failed transmissions (requiring retransmission at higher layers, if configured). With n=2, the user device typically would do two transmissions, but would only do one transmission if any base station decodes the first transmission correctly (on its own). The combining gain across the base stations and the different transmissions results in low SINR requirement and a low probability of failure. With n=3 the SINR is advantageously even lower but to its disadvantage more radio resources are consumed and delay is greater.

According to yet another embodiment said processor is further adapted to receive at least one of said plurality of baseband signals over the backhaul interface.

According to yet another embodiment said transmission interval is a time period between said uplink transmission and a transmission of an ACK or a NACK to said user device.

Further applications and advantages of the invention will be apparent from the following detailed description.

BRIEF DESCRIPTION OF DRAWINGS

The appended drawings are intended to clarify and explain different embodiments of the present invention, in which.

DESCRIPTION OF EMBODIMENTS

Embodiments of the invention achieve joint decoding of baseband signals which correspond to uplink signals received by a plurality of spatially distributed base stations from a user device in a cellular wireless communication system. Spatially distributed base stations are located at different geographic locations such that interconnection between them requires a backhaul link. The base stations are interconnected to the network device and possibly to each other by means of at least one backhaul interface having a round-trip delay being larger than a transmission interval for a HARQ cycle of a HARQ algorithm used in the communication system. The transmission interval may be the time period between the uplink transmission and a transmission of ACK/NACK to the user device.

Herein the round-trip delay is the time period to send received bits at baseband (e.g. soft bits) from a base station to the network device, perform joint decoding and send the result of the decoding (ACK/NACK) back to the base station. The HARQ cycle of uplink transmissions to a base station is the sequence:

Send transmission grant to the user device (may not be needed for a retransmission);

User device transmits;

Base station attempts to decode transmission;

Base station sends ACK/NACK ($T_{ACK/NACK}$ after transmission).

The HARQ cycle time ($T_{HARQCycle}$) represents the time between successive user device transmissions in the same HARQ process, i.e. attempting to deliver the same Medium Access Control (MAC) packet. Multiple HARQ cycles may be needed to deliver a MAC packet successfully, whereby each cycle involves a further transmission and a further attempt to decode the packet using the soft bits of all transmissions up to that point.

Figure 9:
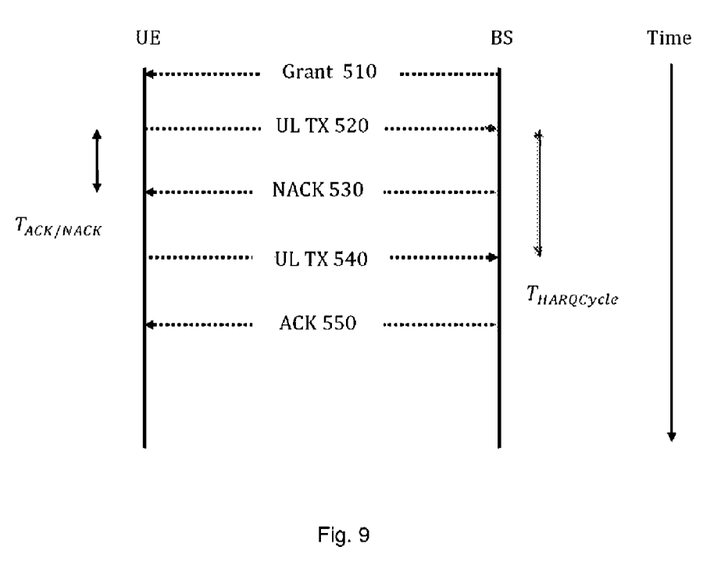
FIG. 9 illustrates HARQ cycle time.

FIG. 9 illustrates a message sequence chart for HARQ transmissions in HSUPA or LTE systems. After reception of the grant 510 the first UL transmission (UL TX 520) of a UE fails and the base station (BS) sends a NACK 530 to the UE. The second UL transmission (UL TX 540) of the UE (when combined with first transmission) gives a successful decoding result and the base station sends an ACK 550. The transmission-acknowledgement time period ($T_{ACK/NACK}$), also referred to as transmission interval, is the time between the transmission by the UE and the transmission of the acknowledgement (ACK/NACK) to the UE, like the time between the first UL TX and the NACK, and the time between the second UL TX and the ACK as shown in FIG. 9. For example, in LTE this is 4 ms, and in HSUPA approximately 6 ms. The HARQ cycle time ($T_{HARQCycle}$) represents the time between successive user device transmissions in the same HARQ process, as shown in the figure.

Therefore, according to the present solution the round-trip delay in the cellular system is too great to allow joint decoding and signalling of decoding success/failure (ACK/NACK) to the user device in time for a retransmission by a given HARQ process. The joint decoding can e.g. take place at one of the base stations or at a central network controller node of the network, such as e.g. the RNC.

With reference to FIGS. 1-8 and 10, the present solution relates to a network device 1 adapted to receive a plurality of baseband signals BBSs corresponding to uplink signals received by said plurality of base stations 10, the uplink signals being associated with an Uplink Transmission (ULT) from a user device 20 of the system. The network device 1 is further adapted to decode the uplink transmission from the user device 20 by combining the plurality of received Baseband Signals (BBSs). The BBSs may carry soft symbols (after demodulation) or soft bits (after decoding).

Figure 10:
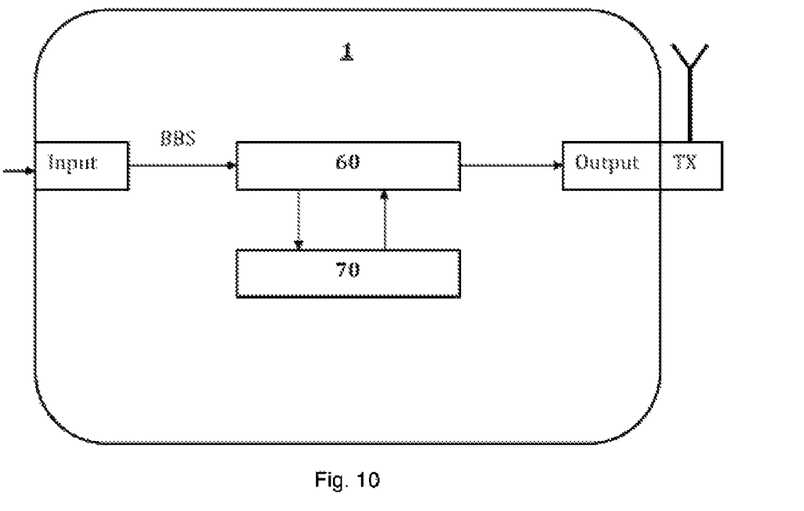
FIG. 10 illustrates an embodiment of a network device according to the present solution.

FIG. 10 shows the aforementioned network device 1 being a base station, or an integrated part thereof, in this case comprising a processor unit 60 communicatively coupled to a memory unit 70, which can store information and program code. The network device further comprises an input unit adapted to receive BBSs and forward them to the processor unit 60 for processing. After processing, such as decoding, a decoded signal is outputted for possibly further processing, and a ACK/NACK may be sent to the user device depending on the result of the decoding by means of a transmit unit (TX). Therefore, the network device 1 may have a processor adapted to receive the baseband signals and further be adapted to decode the received baseband signals.

Figure 12:
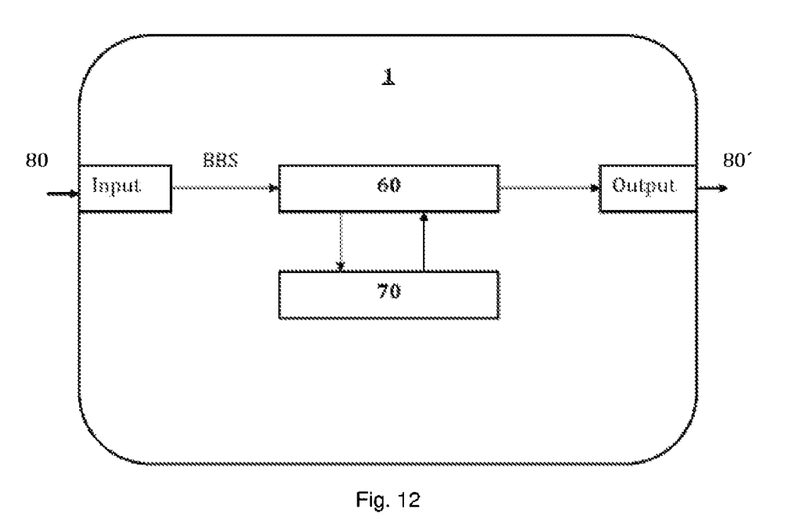
FIG. 12 illustrates another embodiment of a network device according to the present solution

It is further noted that the present network device 1 can be a central network controller or an integrated part thereof. This embodiment is illustrated in FIG. 12 in the network device 1 has a processor unit 60 communicatively coupled to a memory unit 70, which can store information and program code. The network device further comprises an input unit adapted to receive BBSs and forward them to the processor unit 60 for processing. After processing, such as decoding, a decoded signal is outputted for possibly further processing, and ACK/NACK may be sent to the base stations by means of the output unit. The input and output are coupled to the base stations via backhauls 80, 80'.

It should be noted that the present network device 1 can have a receiving unit and a decoding unit instead of the processing unit. The receiving unit is in this case adapted to receive the plurality of baseband signals (BBSs), and the decoding unit is adapted to decode the uplink transmission the user device 20 by combining the plurality of baseband signals (BBSs).

Figure 11:
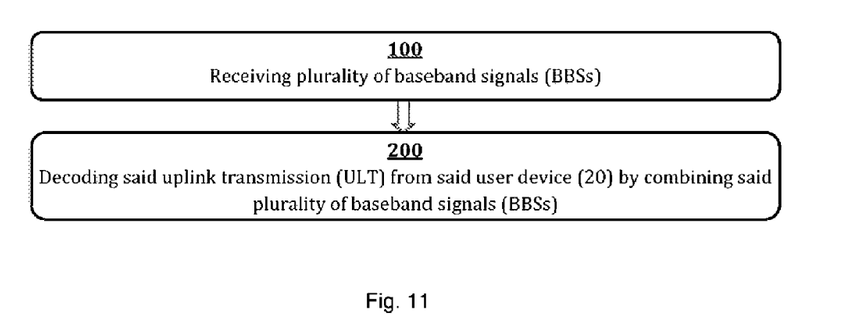
FIG. 11 illustrates an embodiment of a method according to the present solution.

FIG. 11 shows a flow chart of a corresponding method according to the present solution which involves the step of receiving 100 a plurality of baseband signals corresponding to uplink signals received by plurality of base stations 10, wherein said uplink signals being associated with an uplink transmission from a user device 20; and the step of decoding 200 said uplink transmission from said user device 20 by combining said plurality of baseband signals.

The present network device 1 may according to an embodiment be a standalone device adapted for the above described joint decoding. However, the network device 1 may according to another embodiment be an integrated part of another network device such as a base station or a RNC. The expression integrated part can also according to the present disclosure mean that the network device is a base station or a RNC.

The HARQ operating point together with the network device selected for decoding and the delay requirements determine the number of signals that can be combined in the joint decoding process according to the present solution. As an example, using an operating point that exploits n=2 or more HARQ transmissions of a certain HARQ process by the user device (it is referred to consecutive transmissions of the same HARQ process Identity, ID), signals received from HARQ transmissions n=1, 2, . . . , k to can be used to help decode later transmissions, e.g. transmission n=k+1. An operating point of a single HARQ transmission can also be used.

The HARQ working point can be defined as a combination of target decoding success rates at different HARQ transmissions. Concretely, for an embodiment which always acknowledges the n-th HARQ transmission (regardless of the decoding success at the elected node for decoding), the working point can be defined as (approximately) 0% success rate for the first n−1 transmissions and (approximately) 100% success rate at the n-th transmission. Any decoding failure, at this stage, is dealt with re-transmission by higher layers, if configured (e.g. by the Radio Link Control, RLC).

According to yet another embodiment the present cellular wireless communication system 50 is adapted to provide more uplink radio links from the user device 20 than downlink radio links to the user device 20 during uplink transmission ULT. Hence, according to this embodiment the DL radio link active set has size of at least one while the UL radio link active set is two or more. Links that exist on the UL but not on the DL are called virtual links. In order to setup a virtual link the RNC in LTE systems needs to distribute the scrambling code of the UE, or more generally the signature of the UE to the other base stations that need to decode the UE (i.e. a network-side method) or configure additional UE measurements (e.g. using the standardised 1A measurement report).

Determining the uplink active set involves: BSs to be used in combining are identified without using UE reports (cells detect UE after exchange of scrambling code or other id sequence between BSs or from central node); and detection can be dependent upon passing a set energy per chip threshold or SINR threshold. Number of DL radio links can be as in the current architecture of E-DCH. Number of DL radio links is one per UE: this implies the UE has uplink radio links to a BS which has no downlink radio links to the UE. Number of DL radio links is one per BS. This implies that the UE could have more uplink radio links than downlink radio links to the same BS.

As aforementioned, the present network device achieves macro diversity gain and HARQ gain. Therefore, the basebands signal received by the base stations can be combined in a number of ways. One preferred combining method is soft combining which has high decoding performance. The likelihood of correct decoding without soft-combining is quite low, in the order of 1%, by design and due to the HARQ working point. The working point is often specified by the block error rate for a single transmission, the instantaneous Block Error Rate (iBLER).

Another preferred combining method in this context is selection combining. This method considers if one base station has already decoded the transmission successfully in which case there is no need to proceed to soft combining and HARQ transmissions shall be stopped as soon as possible.

Embodiments disclosed herein also relates to different aspects of where in the network the present joint decoding is performed. Some major processing "locations" in the network are suggested herein, namely in a base station, in a base station having the highest computational load among said plurality of base stations, in a serving base station, and in a radio network controller.

The present solution also involves different aspects of the HARQ algorithm employed by the present cellular system. This means that the present joint decoding can be performed using different signal instances of a HARQ process. Therefore, according to an embodiment the HARQ algorithm is configured to send an ACK at n-th HARQ transmission of a HARQ process associated with the user device 20, even if a decoded result from the n HARQ transmissions is unsuccessful. With this HARQ algorithm the network device can combine baseband signals BBSs corresponding to uplink signals for (typically) the first n or first n−1 HARQ transmissions of the HARQ process.

In the case that the network device is a serving base station for the user device the network device may further be adapted to combine baseband signals BBSs corresponding to uplink signals for the previous n−1 HARQ transmissions and a base band signal BBS corresponding to an uplink signal for n-th HARQ transmission associated with the serving base station 10 itself from the user device 20.

According to another embodiment with the above described HARQ algorithm the network device is further adapted to combine baseband signals BBSs corresponding to uplink signals for the first n HARQ transmissions of the HARQ process.

It has been realised that for n equal to 1, 2, or 3 have advantages which has been discussed previously in the present disclosure.

In the following disclosure some exemplary scenarios are discussed with reference to FIG. 1-8 to give a better understanding of the present solution. In the examples HSUPA terminology is used, but it is realised that the present solution is not limited to HSUPA systems only but can be implemented in all suitable cellular wireless communication systems, such as LTE. Further, only two base stations are shown in the examples but the present solution can be applied in cellular systems having two or more spatially distributed base stations receiving UL transmission from a UE.

Exemplary Scenario A

In this case, with reference to FIG. 1-4 which represent snap-shots in time, it is assumed that the joint decoding is performed at the serving Base Station (BS).

First UE UL transmission occurs at t=0:

If the first HARQ transmission (FIG. 1) to the serving BS is in error the serving BS sends a NACK (FIG. 2) to the UD at $t=T_{ACK/NACK}$ and the UD retransmits.

If the serving BS decoding succeeds then it sends ACK (FIG. 2) to the UE and further sends correct decoded bits to the RNC, which means no second transmission from the UE;

The other BSs (only one "other" BS shown in the figures) attempt to decode the UL transmission from the UE and if decoding fails, soft bits are stored, and if decoding succeeds correct hard bits are stored.

Second UE UL transmission (FIG. 3) occurs at $t=T_{HARQ\_Cycle}$:

The serving BS combines the BBS from the other BSs of the first UE UL transmission (that have now arrived over the backhaul) with the first and second UE UL transmissions received at the serving BS. The combing methods at the serving BS may be selection combining, or soft combining.

The serving BS sends ACK or NACK (FIG. 4) at time $t=T_{HARQ_{Cycle}+ACK/NACK}$: depending on the decoding result.

For third and subsequent UE UL transmissions the above principles also applies.

Exemplary Scenario B

As scenario A above, but at the n-th HARQ transmission of a given HARQ ID process (first transmission, second, or higher transmissions depending on the HARQ working point) the serving BS sends an ACK even if still in error at the serving BS which is before joint combining has occurred including the n-th transmission from the other BS. This anticipates that the further combination of all n transmissions will be successful.

Exemplary Scenario C

As scenario A above but both BSs in the figures have downlink radio links to the UE and can therefore send ACK/NACK. The BSs exchange soft bits (or if decoded an indication of success) so that they can use all bits received from first UE UL transmission together with received bits from a single second UE UL transmission when decoding second transmission from the UE. This is a symmetric configuration that improves the decoding success probability but at the cost of additional backhaul traffic and increased decoding complexity.

Exemplary Scenario D

In this example the joint decoding is performed in the BS being the least computational loaded BS among those with uplink radio links from the UE, which may be decided by the RNC. This has the advantage of balancing the computation load in the network, such that more UEs can benefit from joint decoding. The probability that the method cannot be used for one UE because there is insufficient decoding resource at the serving BS (or other BS with an uplink radio link to the UE) is reduced if the computational load is spread evenly across the BSs. The RNC could determine which BS should be the network device for decoding based on load measurements taken by each BS and signalled over the Iub over via the Operations and Management (OAM).

Exemplary Scenario E

This scenario relates to joint decoding at the RNC and is illustrated in FIG. 5-8. At the first UE transmission, every BS is able to send ACK/NACK to the UE can do so based on its own decoded output. In the example, only the serving BS does this (at $t=T_{ACK/NACK}$ FIG. 6).

Figure 1:
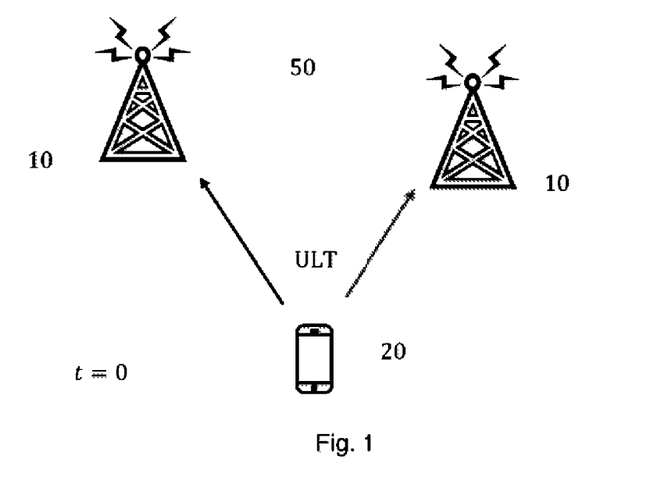
FIG. 1-4 illustrate a possible exemplary scenario in which the present solution is used for joint decoding.
Figure 2:
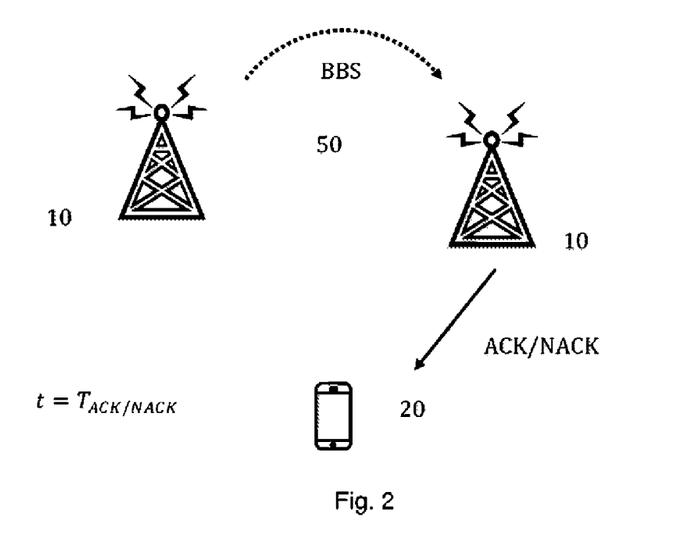
Figure 3:
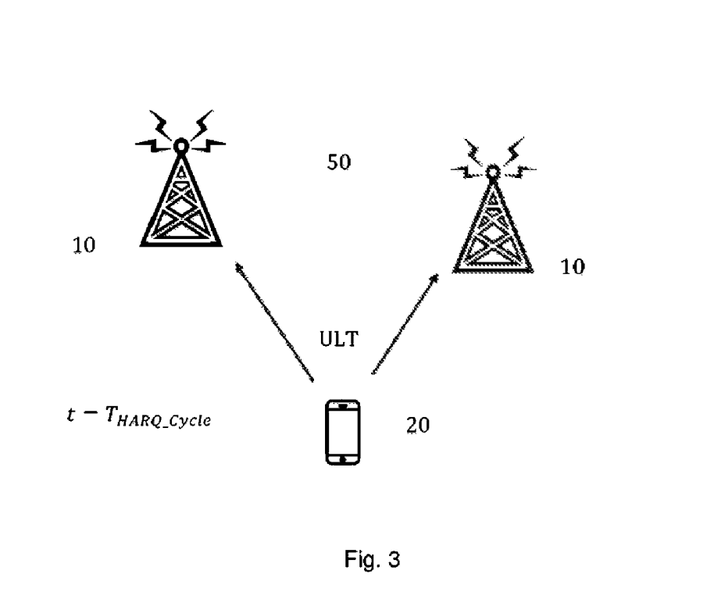
Figure 4:
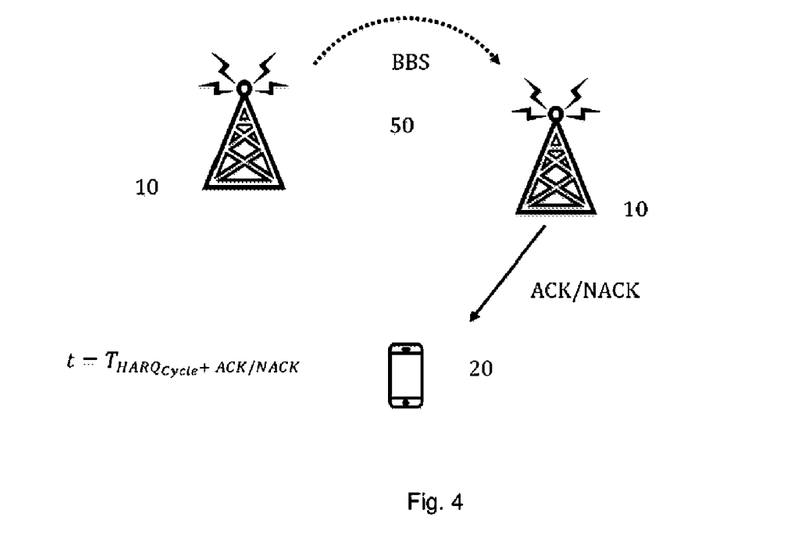
Figure 5:
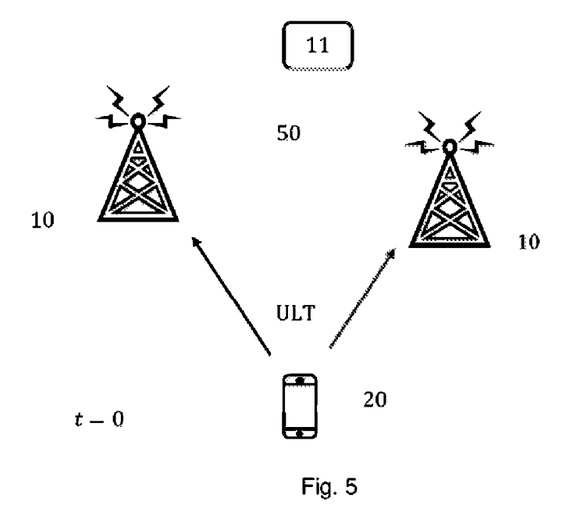
FIG. 5-8 illustrates a possible exemplary scenario with joint decoding in an RNC.
Figure 6:
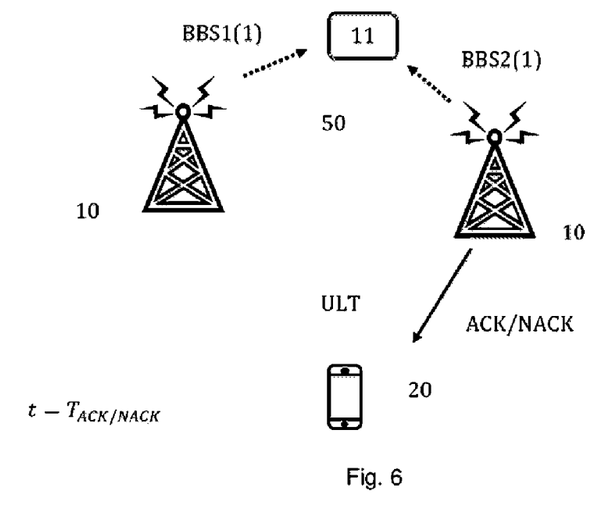
Figure 7:
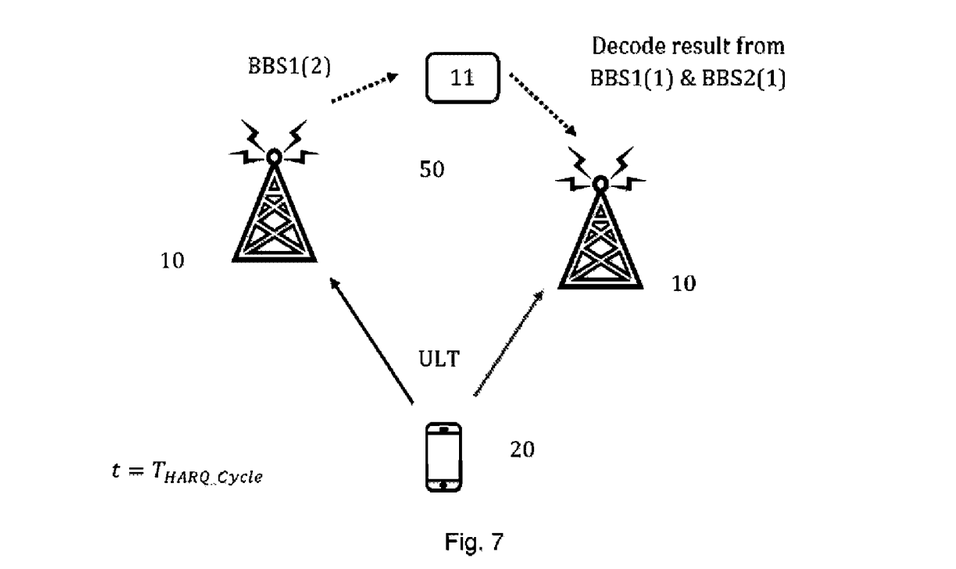
Figure 8:
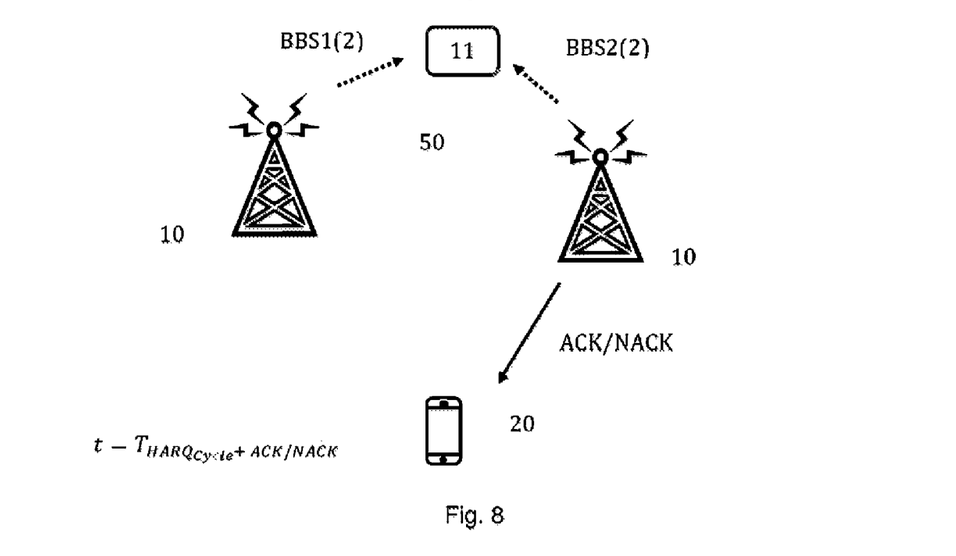

Baseband signals from each BS with one or more uplink radio links for the UE are then sent to the RNC (for example, over the Iub interface). In FIG. 6, BBS1(0) represents the baseband signal generated by BS1 from transmission 1, and BBS2(1) similarly that from BS2. After joint decoding the result (ACK or NACK) must be passed to one or more BS—in the example, again this is the serving BS (FIG. 7). At the second transmission (FIG. 7) both BSs generate further baseband signals and begin to send these to the RNC (BBS1(2) and BBS2(2)—not shown in figure for clarify). The BS considers the joint decoded result and if it is an ACK it can send an ACK at the second transmission (FIG. 8). If it is a NACK it attempts to decode the transmission on its own (combining the two transmissions it has received, FIG. 8).

A variant could be to always configure two transmissions maximum (see exemplary scenario B) and then jointly decode all transmissions at the RNC. By using a central node (like the RNC) for decoding the number of joint transmissions can be increased. Thereby, if we have $N_{BS}$ BSs participating in the joint reception of a UE UL transmission and $N_{HARQ}$ HARQ transmissions for the same HARQ ID, then the number of BBSs that can be combined at the serving BS for decoding can be derived as: $N_{HARQ}*N_{BS}-(N_{BS}-1)$. On the other hand, if we can combine the transmissions at the RNC (or at another central control node of the network) then the number of BBSs is: $N_{HARQ}*N_{BS}$. The RNC based combining may have lower delay than combining at the serving Node B depending on the backhaul configuration.

According to yet another embodiment one or more base stations have an uplink radio link to the user device but no downlink radio link, i.e. using virtual radio links. This means the base stations cannot send ACK/NACK to the user device. Instead other base stations that are used in the joint decoding process and possess downlink radio links to the user device can generate and send the ACK/NACK of the HARQ algorithm.

It shall be understood that the configuration of joint decoding, HARQ operating point, N value etc. can be set individually for each UE according to a number of factors (for example, the cell loading, the UE position, UE available battery, UE service). Further, in the LTE system, the central node (FIG. 5-8) could be a Central or Coordinated RRM entity (Co-RRM) or coordinator node. It shall also be understood that the combined decoding may be soft combining of soft symbols after demodulation or soft bits after decoding.

Furthermore, as described above the present invention also relates to corresponding methods in a network device. The methods correspond, mutatis mutandis, to all different embodiments of the present network device.

Any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present network device comprises the necessary communication capabilities in the form of e.g., functions, means, units, elements, etc., for executing the present method. Examples of other such means, units, elements and functions are: processors, memory, encoders, decoders, mapping units, multipliers, interleavers, de-interleavers, modulators, demodulators, inputs, outputs, antennas, amplifiers, RX unit, TX unit, DSPs, MSDs, TCM encoder, TCM decoder, interfaces, communication protocols, etc. which are suitably arranged together.

Especially, the processors of the present network device may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A network device for joint decoding of received signals in a cellular wireless communication system comprising a plurality of spatially distributed base stations interconnected to said network device by at least one backhaul interface having a round-trip delay being larger than a transmission interval for a Hybrid Automatic Repeat Request (HARQ) cycle of a HARQ algorithm employed by the cellular wireless communication system, said network device comprising:

a memory storing instructions; and
a processor coupled to the memory to execute the instructions to:
receive a plurality of baseband signals (BBSs) corresponding to uplink signals received by said plurality of base stations in uplink radio links, said uplink signals being associated with a plurality of uplink transmissions (ULTs) from a user device, said plurality of uplink transmissions including a first uplink transmission (ULT) that occurred in a cycle of said HARQ algorithm and a second uplink transmission (ULT) that occurred in a cycle of said HARQ algorithm subsequent to the cycle in which said first uplink transmission occurred; and decode said second uplink transmission (ULT) from said user device by combining said plurality of baseband signals (BBSs).

2. The network device according to claim 1, wherein the cellular wireless communication system is adapted to provide more uplink radio links from said user device than downlink radio links to said user device during at least one of said plurality of uplink transmissions (ULTs).

3. The network device according to claim 1, said processor further adapted to establish the uplink radio links after sharing at least one transmission signature for said user device.

4. The network device according to claim 1, wherein said processor executes said instructions to:
 combine said plurality of baseband signals using soft combining or selection combining.

5. The network device according to claim 1, wherein said network device is a central network controller, or an integrated part thereof, and said instructions further comprising: send an Acknowledgement (ACK) or a Negative Acknowledgement (NACK) to said plurality of base stations based on a result of the decoding of said second uplink transmission (ULT).

6. The network device according to claim 1, wherein said network device is a base station, or an integrated part thereof.

7. The network device according to claim 6, wherein said base station is a serving base station for said user device.

8. The network device according to claim 6, wherein said base station is a base station having a lowest computational load among said plurality of base stations.

9. The network device according to claim 6, wherein said processor executes said instructions to:
 send an ACK or a NACK to said user device based on a result of the decoding of said second uplink transmission (ULT).

10. The network device according to claim 7, wherein said processor executes said instructions to:
 combine baseband signals (BBSs) corresponding to uplink signals for previous n−1 HARQ transmissions and a baseband signal (BBS) corresponding to an uplink signal for n-th HARQ transmission associated with said serving base station from said user device.

11. The network device according to claim 1, wherein said processor executes said instructions to:
 combine baseband signals (BBSs) corresponding to uplink signals for first n HARQ transmissions from each of said plurality of base stations).

12. The network device according to claim 1, wherein the HARQ algorithm is configured to send an ACK at n-th HARQ transmission of a HARQ process associated with said user device even if a decoded result from the n HARQ transmissions at individual base stations is unsuccessful.

13. The network device according to claim 1, wherein said processor executes said instructions to:
 receive at least one of said plurality of baseband signals (BBSs) over the backhaul interface.

14. The network device according to claim 1, wherein said transmission interval is a time period between said second uplink transmission and a transmission of an ACK or a NACK to said user device.

15. A method for joint decoding of received signals in a cellular wireless communication system comprising a plurality of spatially distributed base stations interconnected to a network device by at least one backhaul interface having a round-trip delay being larger than a transmission interval for a HARQ cycle of a HARQ algorithm employed by the cellular wireless communication system, the method comprising:
 receiving a plurality of baseband signals (BBSs) corresponding to uplink signals received by said plurality of base stations in uplink radio links, said uplink signals being associated with a plurality of uplink transmissions (ULTs) from a user device, said plurality of uplink transmissions including a first uplink transmission (ULT) that occurred in a cycle of said HARQ algorithm and a second uplink transmission (ULT) that occurred in a cycle of said HARQ algorithm subsequent to the cycle in which said first uplink transmission occurred; and
 decoding said uplink transmission (ULT) from said user device by combining said plurality of baseband signals (BBSs).

16. A non-transitory computer-readable storage medium storing computer-readable instructions that, when executed by a computer, cause the computer to perform the method according to claim 15.

17. A network device for joint decoding of received signals in a cellular wireless communication system comprising a plurality of spatially distributed base stations interconnected to said network device by at least one backhaul interface having a round-trip delay being larger than a transmission interval for a Hybrid Automatic Repeat Request (HARQ) cycle of a HARQ algorithm employed by the cellular wireless communication system, said network device comprising:
 a memory storing instructions; and
 a processor coupled to the memory to execute the instructions to:
  receive a plurality of baseband signals (BBSs) corresponding to uplink signals received by said plurality of base stations in uplink radio links, said uplink signals being associated with an uplink transmission (ULT) from a user device; and
  decode said uplink transmission (ULT) from said user device by combining baseband signals, among the plurality of baseband signals, that correspond to uplink signals for previous n−1 HARQ transmissions and a baseband signal, among the plurality of baseband signals, that corresponds to an uplink signal for n-th HARQ transmission associated with said serving base station from said user device.

* * * * *

UNITED STATES PATENT AND TRADEMARK OFFICE
CERTIFICATE OF CORRECTION

PATENT NO. : 10,237,021 B2
APPLICATION NO. : 15/345632
DATED : March 19, 2019
INVENTOR(S) : FrancescoDavide Calabrese et al.

Page 1 of 1

It is certified that error appears in the above-identified patent and that said Letters Patent is hereby corrected as shown below:

On the Title Page

Second column, Item (57) Abstract, Line 30, delete "() adapted" and insert --(60) adapted-- therefor.

Signed and Sealed this
Twenty-ninth Day of October, 2019

Andrei Iancu
*Director of the United States Patent and Trademark Office*